June 29, 1937.  H. P. MACOMBER  2,085,667
HACKSAW CONSTRUCTION
Filed Sept. 20, 1935  2 Sheets-Sheet 1
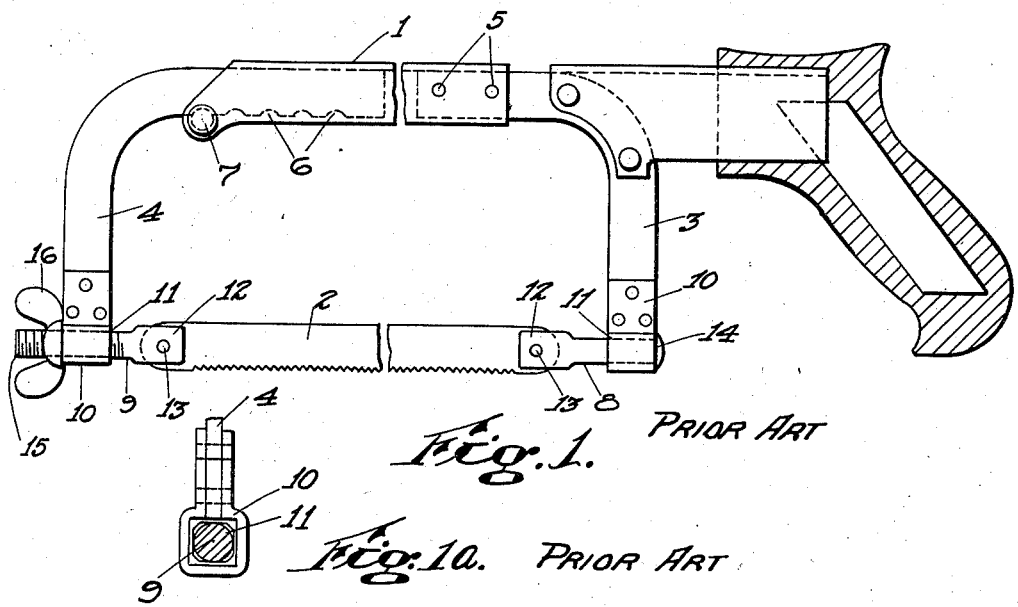
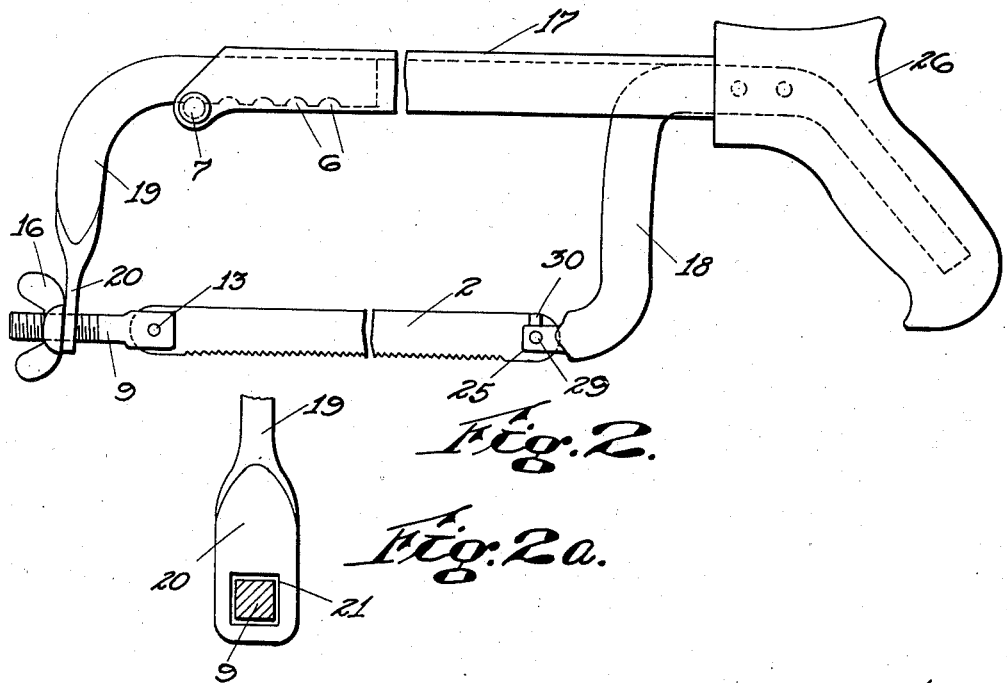
Inventor:
Harry P. Macomber
By Geo. H. Kennedy
Attorney

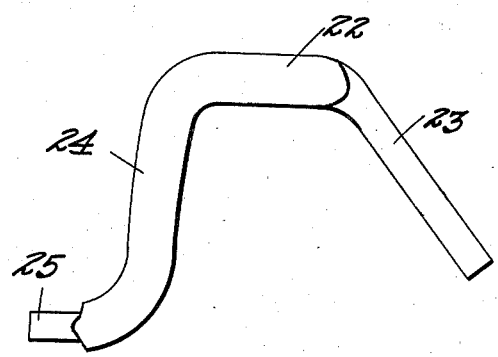
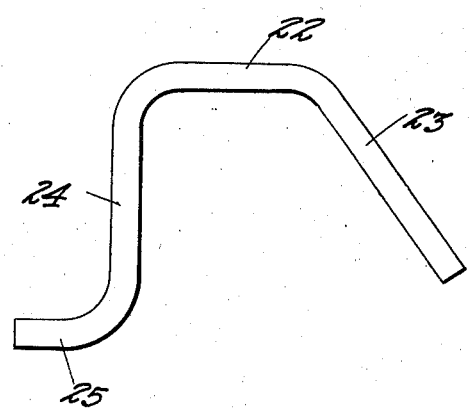
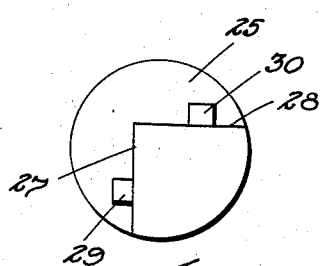
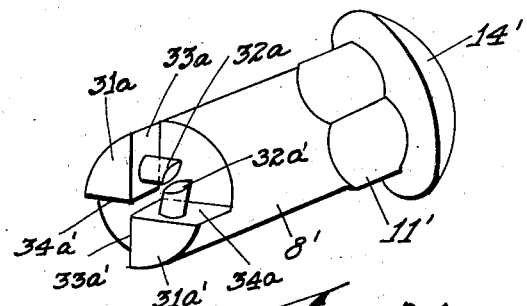
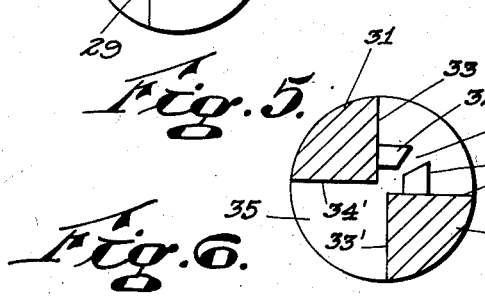

Patented June 29, 1937

2,085,667

UNITED STATES PATENT OFFICE 2,085,667

HACKSAW CONSTRUCTION

Harry P. Macomber, Worcester, Mass., assignor to Parker Wire Goods Company, Worcester, Mass., a corporation of Massachusetts Application September 20, 1935, Serial No. 41,445

2 Claims. (Cl. 145—34)

The present invention relates to hack saws and like devices, wherein the saw blade is removably mounted in a suitable supporting and tensioning frame. My improvements are shown herein, for illustrative purposes, in connection with hack saws of the general type dealt with in Priest Patent No. 2,058,107 dated October 20, 1936, but it will be understood that the features of my invention are not limited to use in saws of this particular type.

An object of the invention is to simplify the manufacture of the frame and to reduce the number of parts required; in particular, to eliminate the need for one of the usual separate angularly adjustable blade tensioning devices that have heretofore been provided in saw constructions of this type. This is accomplished without curtailing in any way the ability of the frame to hold and tension the blade in a variety of different angular positions.

Another object is to provide for more positive retention of the saw blade, by arranging for both of its surfaces to be opposed by substantially flat surfaces of the blade holding and tensioning devices. Other and further objects and advantages of the invention will be apparent from the following detailed description of the same, taken in connection with the accompanying drawings, in which—

Fig. 1 is a view in side elevation of a hack saw of the typical prior construction referred to in the aforesaid Priest application, parts being shown in section.

Fig. 1a is a fragmentary end view, partly in section, of the saw of Fig. 1.

Fig. 2 is a side view, illustrating one embodiment of my improved hack saw.

Fig. 2a is a fragmentary end view, partly in section, of the saw shown in Fig. 2.

Figs. 3 and 4 are detail views, illustrating steps in the manufacture of one end member of my improved hack saw frame.

Fig. 5 is a fragmentary large scale end view of the member shown in Fig. 4, as finished.

Fig. 6 is a view similar to Fig. 5, illustrating a modified construction.

Fig. 7 is a perspective view, illustrating the application to a separate blade holder of the arrangement shown in Fig. 6.

Like reference characters refer to like parts in the different figures.

Referring first to Figs. 1 and 1a, showing a typical hack saw construction of the prior art, the saw frame proper is of shallow inverted U form, being constituted by an intermediate elongated member 1, parallel to the saw blade 2 and of downwardly opening channel section, and by two generally upright end members 3 and 4 of wide relatively flat stock, both of these members, at their upper ends, being bent or curved to provide substantially horizontal portions that are received and secured in the channel of member 1. One such member 3 is rigidly secured to the channel member 1 by rivets 5, 5, or the like; the other member 4 usually has an adjustable mounting in the member 1, to vary the length or span of the frame, thereby to adapt it to saw blades of different lengths. For this purpose, the horizontal portion of said member 4 is provided at its lower edge with a plurality of notches 6, 6 adapted to cooperate with a pin 7 carried transversely by the member 1; before the saw blade 2 is put in place, the member 4 can be moved in or out as desired, to bring any selected notch 6 into engagement with pin 7, thereby to make the length of the frame appropriate to the length of the blade which is to be used therein.

Fig. 1 also shows the conventional blade-holding and tensioning devices 8 and 9 which are removably and adjustably carried by suitable socket or bearing elements 10, 10 secured to the lower ends of the members 3 and 4. The thinness of the stock used for members 3 and 4, coupled with the fact that said members must have a flatwise disposition in the plane of the frame to give the latter the necessary rigidity, makes necessary the use of these attached socket elements 10, 10 in order to furnish a mounting of adequate thickness for the slidable reception of the devices 8 and 9. The devices 8 and 9 have portions 11 of square cross section, slidably received by square holes of the socket elements 10, 10, and at their inner ends, said devices 8 and 9 are slabbed off to provide flat surfaces 12, 12, from which project the pins 13, 13 for engagement with holes at the ends of the blade 2. The device 8 has an enlargement or head 14, and the device 9 has its outer end threaded, as shown at 15, to receive a thumb nut 16, adapted to be manipulated for the mounting or demounting of a blade and for putting the same under tension in the frame. The squared engagement of the two devices 8 and 9 in their sockets 10, 10 prevents the blade 2 from tilting or turning and provides for the holding of same in any selected one of four different angular positions; that is to say, the blade may be disposed in a vertical plane, with its teeth on either the upper or the lower edge, or it may be disposed in the horizontal plane with its teeth either on the right hand or on the left hand edge. To change this angular adjustment, the thumb nut must be loosened for removal of the blade and then the devices 8 and 9 must be withdrawn endwise and reinserted in the different angular positions that will give the desired setting of the blade.

In the embodiment of my invention illustrated by Fig. 2, I preferably utilize for the frame construction proper an assemblage of parts similar to that described in the aforesaid Priest patent, and consisting, as shown, of an elongated member 17 parallel to the saw blade 2 and of downwardly opening channel section, the sides of said channel section embracing and receiving flatwise near each end the thin flat stock of the frame's end members or uprights 18 and 19. The outer end member 19, here shown as adjustable, to vary the length of the frame, has for this purpose the usual notches 6 for cooperation with the pin 7 of member 17; this member 19 is preferably, but not necessarily, made, according to the invention of the aforesaid Priest patent, from a suitably bent piece of round wire rod stock, by successive hammering, rolling, or pressing operations that flatten the piece longitudinally for most of its length, and flatten it transversely, as shown at 20, at its lower extremity,—thus to provide, as disclosed in said Priest patent, a sufficient width of stock, transversely of the frame, for the formation of a square aperture 21 adapted to receive the usual adjustable blade tensioning device 9, and to provide a thrust surface for the latter's thumb nut 16.

My invention is particularly concerned with that end member (here designated 18) which does not carry the adjustable tensioning device 9, but which in the ordinary case would carry a stationary tensioning device, such as shown at 8 in Fig. 1; according to my invention, the need for providing such a tensioning device 8 and its mounting is entirely eliminated. As shown in Figs. 3 and 4, the end member 18 is made from a piece of wire rod stock, which is appropriately bent to provide an intermediate substantially horizontal portion 22 and the depending divergent portions 23 and 24, the latter terminating in a relatively short substantially horizontal extension 25. The piece shown in Fig. 3 is subjected to a pressing or hammering operation, by which to flatten out the portions 22 and 24, as shown in Fig. 4,—leaving the portions 23 and 25 substantially round. According to the aforesaid Priest invention, the flattened portion 22 is united with the channel member 17, and the unflattened portion 23 provides a core or reinforcement for the handle 26 of the saw, which is molded to embed said portion 23 and the adjacent end of channel member 17.

Fig. 5 shows one construction which may be given to the integral extension 25 of end member 18, in order to do away with the need for any separate slidably mounted holding device at the lower end of said member. The substantially round stock section of extension 25 is slabbed off to provide a substantially vertical surface 27 and a substantially horizontal surface 28; a pin 29 projects outwardly from surface 27 in substantially the same horizontal plane as that occupied by the pin 13 of adjustable tensioning device 9 at the other end of the frame, when said tensioning device occupies the angular position shown by Fig. 2; thus the pins 13 and 29 serve to support the blade 2 in a vertical plane, with its teeth on either the upper or the lower edge.

When the tensioning device 9 is shifted through 90°, to dispose its pin 13 in a vertical position, a pin 30, projecting upwardly from surface 28, becomes the retaining means for the inner end of blade 2,—this adjustment being used when the blade is disposed in a horizontal plane with its teeth either on the right hand or the left hand edge. Thus by the described construction and arrangement which eliminates one of the usual separate blade holding and tensioning devices, the blade nevertheless has the same range of angular adjustment or setting as heretofore provided. It will be understood, of course, that the integral blade retaining extension 25 can be provided on either the fixed or the adjustable end member of a saw frame construction of the type herein described.

In the modified form of my invention shown in Fig. 6, the integral extension 25' of the end frame member (either the member 18 or the member 19) is slabbed or sawed off to provide substantially opposed quadrant sections 31, 31', from whose flat surfaces project a pair of pins 32, 32' that converge toward each other. This construction, when used with an adjustable blade-holding and tensioning device whose pin (13) is capable of being set, either in the plane of pin 32 or of pin 32', gives the same 4-way angular adjustment for the saw blade, as above described, and in addition, possesses the following important advantage:—

Assuming the saw blade in a substantially vertical position, to be engaged with the pin 32, (the latter projecting horizontally), it will be clear that the retention of said blade will be much more secure than in the ordinary case, because one blade surface will be substantially contacted by the flat surface 33 of quadrant 31, while the other blade surface will be substantially contacted by the flat surface 33' of quadrant 31'. Similarly, with the blade at 90° from the above described adjustment, (impaled on pin 32'), the flat quadrant surfaces 34 and 34' become effective in the same way, as supports or abutments for the opposite blade surfaces, to resist tipping or displacement of said blade, in the operation of the saw. It will be understood that my invention has within its contemplation the application of the multiple pin arrangements shown by Figs. 5 and 6 not only to a frame member proper of the saw, but also to separate blade-holding and tensioning devices, of the character shown at 8 and 9 in Fig. 1. For example, Fig. 7 shows the arrangement of Fig. 6 as applied to a blade holder 8' of the type shown at 8 in Fig. 1, and having a squared portion 11' and a head 14'. The end of such device is slabbed off to provide the quadrants 31a and 31a', providing, respectively, the pins 32a and 32a'. These quadrants provide respectively, the coacting surfaces 33a and 33a' for engagement with opposite surfaces of the blade when the latter is impaled on pin 32a, and the coacting surfaces 34a and 34a' for similar opposite surface engagement with the blade when the latter is impaled on pin 32a'. The pins at their ends are bevelled, as shown at 35, Fig. 6, to give room for the passage of the blade between them.

I claim:

1. In a hack saw or the like, a member providing a blade-supporting terminal portion of substantially round stock section, the latter being cut away to provide opposite connecting recesses of substantially quadrant form, there being a saw blade-holding pin projecting from each radial face limiting one of said recesses, and each radial face limiting the other recess being offset slightly from the corresponding parallel face of the first-named recess to provide a retaining abutment operative against the outside surface of the saw blade, when the latter is engaged with a pin of the first-named recess.

2. In a hack saw or the like, a member providing a blade-supporting terminal portion of substantially round stock section, the latter being cut away to provide opposite connecting recesses of substantially quadrant form, there being a saw blade-holding pin projecting from each radial face limiting one of said recesses, and each radial face limiting the other recess being offset slightly from the corresponding parallel face of the first-named recess to provide a retaining abutment operative against the outside surface of the saw blade, when the latter is engaged with a pin of the first-named recess, the two pins at their meeting ends being bevelled off to provide a blade-receiving slot between them, for the passage of the edge of said blade into the space connecting the two recesses.

HARRY P. MACOMBER.